United States Patent Office 3,183,265
Patented May 11, 1965

3,183,265
ACYLPHENYLACYLAMIDO-1,3-PROPANEDIOLS AND PREPARATION THEREFOR
Maximilian von Strandtmann, Rockaway Township, John Shavel, Jr., Mendham, and George Bobowski, East Orange, N.J., assignors to Warner-Lambert Pharmaceutical Company, Morris Plains, N.J., a corporation of Delaware
No Drawing. Filed Oct. 16, 1962, Ser. No. 231,027
15 Claims. (Cl. 260—552)

This invention relates to novel substituted 1,3-propanediols having the following structural formulas:

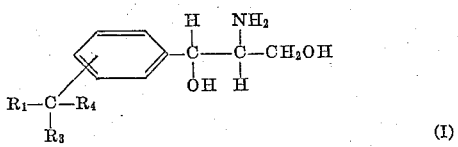

(I)

and

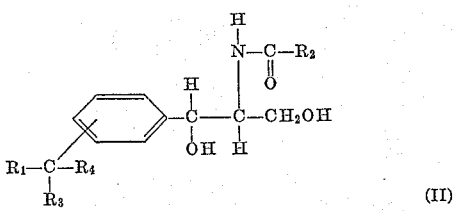

(II)

wherein $R_1$ represents lower alkyl such as methyl, ethyl, propyl, isopropyl or isobutyl, cycloalkyl such as cyclopentyl or cyclohexyl, substituted cycloalkyl such as halocycloalkyl, aryl such as phenyl, substituted aryl such as tolyl or hydroxy phenyl, heterocyclic such as pyridyl or furyl and $R_2$ represents lower alkyl, aryl, aralkyl, cycloalkyl, haloalkyl such as chloromethyl, fluoromethyl, dihaloalkyl such as dichloromethyl, dibromomethyl, heterocyclic, azidoalkyl such as azidomethyl or azidoethyl, cyanoalkyl such as cyanomethyl or cyanoethyl, $R_3$ is hydrogen when $R_4$ is hydroxy or $R_3$ and $R_4$ taken together form an $=O$, $=NH$ or

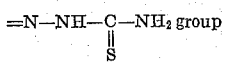

This invention also relates to a new and novel method for the production of the above compounds and to certain novel intermediates obtained during their synthesis. Exemplary of the new and novel compounds of this invention are D-threo-1-(p-acetylphenyl)-2-(2,2-dichloroacetamido)-1,3 - propanediol, D-L-threo-1-(p-acetylphenyl)-2-(2,2-dichloroacetamido)-1,3-propanediol, D-threo-1-(p-benzoylphenyl) - 2(2,2 - dichloroacetamido)-1,3-propanediol, D-threo-1-(p-cyclohexylcarbonylphenyl)-2-(2,2-dichloroacetamido)-1,3-propanediol and the like.

The novel compounds of our invention are useful as antimicrobial agents. For example, they exhibit bactericidal and bacteriostatic action against gram positive bacteria such as Staphylococcus and Streptococcus, against gram negative bacteria such as Proteus, Pseudomonas and Salmonella, and against protozoa such as *E. histolytica*. The compounds, alone or together with other active ingredients, can be formulated with solid or liquid inert pharmaceutical carriers into dosage forms such as tablets, capsules, elixirs, suspensions or parenterals.

In accordance with our invention, our new compounds are prepared by the following sequence of steps.
Step I of our novel process comprises treating the compound 2-acetamido-1-cyanophenyl-1,3-propane-diol:

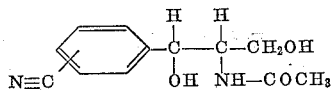

with an excess of a Grignard reagent of the formula $R_1MgX$, where $R_1$ has the same meaning as defined above and $X$ is a halogen, followed by the hydrolysis of the reaction product with water to yield a compound of the following structure:

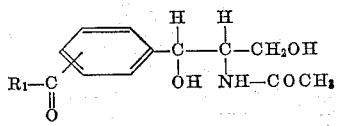

In lieu of employing a Grignard reagent in the above reaction we may also employ the lithium reagent $R_1Li$ to effect the same reaction and produce the above reaction product upon hydrolysis with water.

Step II comprises a further hydrolysis of the compounds obtained in accordance with Step I in an acidic medium to obtain by hydrolysis the amino-compound of the following structure:

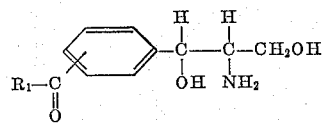

Step III comprises reacting the product of Step II, for example, with an ester such as methyldichloroacetate thereby forming the compounds of this invention having the following formula:

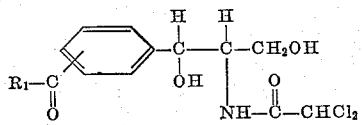

It will be readily appreciated by those skilled in the art that the novel compounds of this invention identified as I and II above contain two asymmetric carbon atoms. Consequently, these novel compounds may exist in isomeric forms which include structural as well as optical isomers. The term "structural" in referring to isomeric forms as used herein refers to either the threo or erythroform and these differences refer to the planar relationship of the polar groups attached to the two asymmetric carbon atoms. Thus, for example, the erythro compounds are products wherein the two most highly polar of the groups attached to the two asymmetric carbon atoms lie on the same side of the plane of the two asymmetric carbon atoms. Conversely, the threo compounds are those wherein the two most highly polar groups lie on opposite sides of the plane of the two carbon atoms.

Both the threo and erythro forms exist as racemates of optically active isomers which can be resolved into the dextro (D) and levo (L) rotary forms by methods known to the art. In other words, the compounds of this invention can exist in four different isomeric forms.

The following examples are given in order further to illustrate the structural relationships.

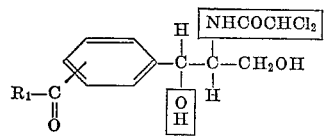

D-threo isomer

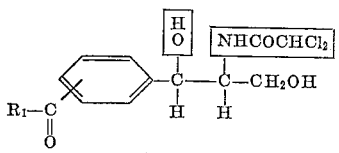

D-erythro isomer

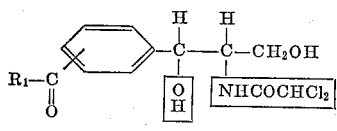

L-erythro isomer

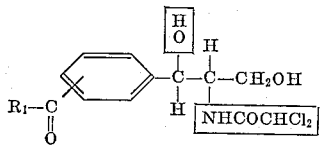

L-threo isomer

In order further to illustrate this invention but without being limited thereto, the following examples are given:

EXAMPLE I

*D-threo-1-(p-acetylphenyl)-2-acetamido-1,3-propanediol*

To a stirred solution of 4.0 g. of D-threo-1-(p-cyanophenyl)-2-acetamido-1,3-propanediol in 400 ml. of dry tetrahydrofuran is added dropwise 150 ml. N ethereal methyl lithium over a period of five hours while at a temperature of 40–45° C. After further stirring for two hours at 40° C., the reaction mixture is cooled to 0° C. and is mixed with a solution of 50 g. ammonium sulfate in 50 ml. of water. The two layers formed are separated and the aqueous phase is extracted with six 100 ml. portions of a mixture of tetrahydrofuran-ethyl acetate (1:1). The organic extracts are combined and the solvent is removed in vacuo. The residue is taken up with 150 ml. of 10% aqueous sulfuric acid and heated on a steam bath under a nitrogen atmosphere for three hours. Upon cooling to 20° C. the solution is extracted twice with 100 ml. of ether. The aqueous phase is made alkaline with sodium hydroxide at 0° C. and extracted six times with 100 ml. of ethyl acetate-tetrahydrofuran (2:1). The combined extracts are dried over sodium sulfate, and the solvent is removed in vacuo at 40° C. The resulting brown semi-solid is passed over 150 g. of florisil using ethyl acetate (1–4 fractions, 50 ml. each), ethyl acetate-tetrahydrofuran, 1:1 (5–9 fractions, 50 ml. each), and tetrahydrofuran-isopropanol, 1:1 (10–20 fractions) as eluants. Fractions 3–8, after evaporation to dryness and trituration with 7 ml. ethyl acetate gives 0.3 g. of white crystals, M.P. 161–162° C. The infrared spectra shows it to be the acetamide derivative, D-threo-1-(p-acetylphenyl)-2-acetamido-1,3 - propanediol. Recrystallization of said compound from ethyl acetate gives a purified product as white, shiny needles, M.P. 166°–167° C., $[\alpha]_D^{25}=+7.0$, c.=.51, methanol.

Analysis for $C_{13}H_{17}NO_4$:
  Calc.: C=62.13; H=6.82; N=5.57.
  Found: C=61.85; H=6.95; N=5.55.

EXAMPLE II

*D,L-threo-1-(p-acetylphenyl)-2-(2,2-dichloroacetamide) 1,3-propanediol*

To a magnetically stirred solution of 6 g. of D,L-threo-(p-cyanophenyl)-2-acetamido-1,3-propanediol in 500 ml. of tetrahydrofuran are added dropwise over a period of four hours 290 ml. of a 0.5 N solution of methyl lithium in ether-tetrahydrofuran. The reaction is carried out at 50° C. and under exclusion of moisture. When the addition of methyl lithium is complete the reaction mixture is allowed to stir for an additional two hours and at the conclusion of the two hour period 75 ml. of a saturated solution of ammonium sulfate in water is added. The organic layer is then separated from the aqueous phase, and the latter is extracted with 200 ml. of a mixture containing equal parts of tetrahydrofuran and ethylacetate. The tetrahydrofuran and ethyl acetate extract is again separated from the aqueous phase and the organic layer is combined with the previously obtained organic phase. The combined organic phases are then evaporated in vacuo at 25°–27° C. The dried residue is then treated with 250 ml. of a 10% solution of sulfuric acid in water and the mixture is heated in a steam bath for two hours. Then the mixture is cooled, basified with a 20% aqueous solution of potassium hydroxide and is extracted with five 400 ml. portions of ethyl acetate. The ethyl acetate extracts are combined and dried over anhydrous sodium sulfate and the solvent is removed in vacuo at 25°–27° C. to obtain an oily liquid. The oily liquid is dissolved in 60 ml. methanol and refluxed with 5 ml. methyl dichloroacetate for two hours. At the end of the refluxing, the mixture is evaporated to dryness in vacuum at 25°–27° C., to obtain an oily residue of crude D,L-threo-p-acetylphenyl-2-(2,2 - dichloroacetamido) 1,3-propanediol. The oily residue is purified by column chromatography on florisil to obtain D,L-threo-p-acetylphenyl-2-(2,2-dichloroacetamido) 1,3-propanediol in crystalline form. Further purification is effected by recrystallizing from a mixture of ethylacetate and petroleum-ether. The recrystallized form melts at 130° C.

Analysis for $C_{13}H_{15}Cl_2NO_4$:
  Calc.: C=48.76; H=4.72; N=4.38; Cl=22.15.
  Found: C=48.70; H=4.82; N=4.48; Cl=22.04.

EXAMPLE III

*D-threo-1-(p-acetylphenyl)-2-(2,2-dichloroacetamido) 1,3-propanediol*

To a stirred solution of 8.0 g. of D-threo-1-(p-cyanophenyl)-2-acetamido-1,3-propanediol in 600 ml. of tetrahydrofuran is added 200 ml. of 0.8 N ethereal methyl lithium dropwise over a period of two hours at 38° C. After an additional stirring at 40° C. for two hours, another portion of 100 ml. of 0.8 N methyl lithium is added and the stirring continued for two more hours at 45° C. The subsequent infrared spectrum shows an absence of the cyano function. A solution of 100 g. ammonium sulfate in 100 ml. of water is added dropwise to the reaction mixture at 0° C. and stirred for two hours at 25° C. The two layers are then separated and the aqueous phase is extracted four times with 200 ml. of ethyl acetate-tetrahydrofuran (1:1). The organic extracts are combined and the solvent is removed in vacuo at 35° C. The residue is taken up with 300 ml. of 10% aqueous sulfuric acid and heated under nitrogen on a steam bath at 95° C.–98° C. for three hours. Upon cooling to 25° C. the acidic brown solution is extracted twice with 75 ml. of ethyl acetate to remove impurities and some unchanged amide. The aqueous solution is made basic with concentrated sodium hydroxide at 0° C. and extracted with 8 portions of 400 ml. each of ethyl acetate. The combined extracts are dried over anhydrous sodium sulfate and the solvent is removed in vacuo at 35° C.

The brown semi-solid residue is taken up with 50 ml. of methanol and 13 ml. of methyl dichloroacetate and refluxed under nitrogen for four hours. The solvent and excess methyl dichloroacetate are removed in vacuo at 30° C. The brown semi-solid residue is passed over 100 g. of florisil. The column is eluted with ethyl acetate (1–15 fractions, 50 ml. each), ethyl acetate-methanol (16–20) and acetone-methanol, 1:1 (21–25). Fractions 2–4, containing most of the product, are triturated with ether-ethyl acetate after the evaporation to dryness, giving 1.65 g. of white crystals of the reaction product, D-threo-1-(p-acetylphenyl)-2-(2,2-dichloroacetamido) - 1,3 - propanediol, M.P. 126–128°, $[\alpha]_D^{25} = +13.2$, c.=1.31, methanol. Recrystallization of this material from ethyl acetate-cyclohexane (1:1) gives analytically pure white, shiny needles, M.P. 128–129°, $[\alpha]_D^{25} = +14.8$, c.=1.75, methanol. The fractions 15–25 are rechromatographed over 80 g. florisil to yield additional 1.15 g. of white crystals, M.P. 125–127° C., $[\alpha]_D^{25} = +13.4$, c.=1.25, methanol.

Analysis for $C_{13}H_{14}NCl_2O_4$:
Calc.: C=48.76; H=4.72; N=4.38; Cl=22.15.
Found: C=48.48; H=4.86; N=4.25; Cl=22.35.

EXAMPLE III-A

*Alternate procedure for preparing D-threo-1-(p-acetylphenyl)-2-(2,2-dichloroacetamido)-1,3-propanediol*

To a stirred solution of 1.5 g. of D-threo-1-(p-cyanophenyl)-2-acetamido-1,3-propanediol in 200 ml. of anhydrous tetrahydrofuran (distilled from LiAlH₄) is added 100 ml. of N ethereal methyl magnesium iodide at 40° C. over a period of one hour. After stirring at this temperature for two hours, the mixture is then refluxed for five hours. To facilitate the solution of the solid complex, 200 ml. of anhydrous tetrahydrofuran is added and continued to reflux for eight hours. At this point another portion of 50 ml. of N ethereal methyl magnesium iodide and 150 ml. of tetrahydrofuran are added and refluxed for seven hours to complete the reaction.

A solution of 120 g. of ammonium sulfate in 125 ml. water is added dropwise at 0° C. and the two phases are separated. The aqueous phase is extracted five times with 100 ml. of tetrahydrofuran-ethyl acetate (2:1). The organic extracts are combined and the solvent is removed in vacuo at 35° C. The residue is taken up with 50 ml. of 10% aqueous sulfuric acid and is heated on a steam bath under nitrogen for three hours. The dark solution is made alkaline with sodium hydroxide at 0° C. and extracted five times with 100 ml. of ethyl acetate-tetrahydrofuran (2:1). The combined extracts are evaporated in vacuo at 40° C., 50 ml. of dry benzene is added to remove azeotropically all traces of water. To the resulting residue is added 3 ml. of methyl dichloroacetate and 15 ml. of methanol and refluxed under nitrogen for three hours. The methanol and the excess methyldichloroacetate are removed in vacuo at 60° C. The residue is passed over 30 g. of florisil, ethyl acetate (fractions 1–10, 25 ml. each) and acetone (fractions 11–15, 35 ml. each) being used as eluants. The fractions 3–7 are recrystallized from ethyl acetate-ether (1:1) to give 0.46 g. of D-threo-1-(p-acetylphenyl)-2-(2,2 - dichloroacetamido)-1,3-propanediol as white crystals, M.P. 128–130° C. $[\alpha]_D^{25} = +13.0$, c.=.725, methanol.

EXAMPLE IV

*D-threo - 4' - [2-(2,2-dichloroacetamido)-1,3 - dihydroxypropyl]-acetophenone thiosemicarbazone*

A solution of 0.132 g. of D-threo-1-(p-acetylphenyl)-2-(2,2-dichloroacetamido)-1,3-propanediol in 2 ml. of methanol is mixed with 0.037 g. of thiosemicarbazide in 25 ml. of methanol and the clear solution is refluxed for one hour. Isopropanol (10 ml.) is added and the mixture concentrated to 10 ml. Cooling and filtration gives 0.08 g. of D-threo-4'-[2-(2,2-dichloroacetamido)-1,3-dihydroxypropyl]-acetophenone thiosemicarbazone in the form of white, fine granules, M.P. 176° C. Concentration of the mother liquor to 5 ml. and cooling gives additional 0.03 g. of the reaction product.

Analysis for $C_{14}H_{18}N_4O_3Cl_2S$:
Calc.: C=42.75; H=4.62; N=14.25; Cl=18.03.
Found: C=42.74; H=4.83; N=14.46; Cl=17.84, 17.94.

EXAMPLE V

*D-threo-1-[p-(α-iminobenzylphenyl)]-2-acetamido-1,3-propanediol*

To the stirred solution of 1.5 g. of D-threo-1-(p-cyanophenyl)-2-acetamido-1,3-propanediol in 120 ml. of dry tetrahydrofuran is added 50 ml. of 0.9 N ethereal phenyl lithium dropwise over a period of one hour at 30–35° C. and allowed to stir for one more hour. The subsequent infrared spectrum shows the absence of the cyano function. 30 ml. of saturated aqueous ammonium sulfate solution is then added with stirring at 0° C. and the two layers are separated. The aqueous phase is extracted with 3 portions of 50 ml. ethyl acetate. The organic layers are combined and the solvent is removed in vacuo. The residue is passed over 60 g. florisil. The column is eluted with ethyl acetate (15 fractions, 30 ml. each). Fractions 3–10 contained an almost colorless residue which crystallizes on trituration with ethyl acetate, to give 0.9 g. of white crystals, M.P. 176–182° C., $[\alpha]_D^{25} = +4.5$, c.=9, methanol. Recrystallization from isopropanol-acetone (1:1) gives D-threo-1-[p-(α-iminobenzylphenyl)]-2-acetamido-1,3-propanediol as an analytically pure product, M.P. 186–187° C., $[\alpha]_D^{25} = +3.2$, c.=.95, methanol.

Analysis for $C_{18}H_{20}N_2O_3$:
Calc.: C=69.21; H=6.45; N=8.97.
Found: C=68.88, 68.93; H=6.31, 6.59; N=8.74, 8.89.

EXAMPLE VI

*D-threo-1-(p-benzoylphenyl)-2-(2,2-dichloroacetamido)-1,3-propanediol*

0.9 g. of D-threo-1-[p-(α-iminobenzylphenyl)]-2-acetamido-1,3-propanediol is taken up with 50 ml. of 10% aqueous sulfuric acid and heated at 95–98° C. under nitrogen for two and one-half hours. After cooling to room temperature, the solution is extracted with 100 ml. of ether and the ethereal layer is discarded. The aqueous layer is made alkaline with concentrated sodium hydroxide at 0° C. and extracted with four 75 ml. portions of ethyl acetate. The solvent of the combined extracts is removed in vacuo at 45° C. The residue is taken up with 15 ml. of methanol and 3 ml. of methyl dichloroacetate and refluxed under nitrogen for three hours. The solvent and the excess reagent are removed in vacuo at 40° C. and the resulting gum is passed over 35 g. of florisil. The column is eluted with ether (fractions 1–3, 25 ml. each), ethyl acetate (fractions 3–8) and methanol (fractions 9–15). Fractions 2–7 on trituration with ethyl acetate-ether (1:1) give 0.55 g. of D-threo-1-(p-benzoylphenyl)-2-(2,2-dichloroacetamido)-1,3-propanediol in the form of white crystals, M.P. 160–161° C., $[\alpha]_D^{25} = +7.6$, c.=.725, methanol. Recrystallization of this material from ethyl acetate-cyclohexane (1:1) gives analytically pure product, M.P. 160–161° C., $[\alpha]_D^{25} = +7.8$, c.=.90, methanol.

Analysis for $C_{18}H_{17}NCl_2O_4$:
Calc.: C=56.55; H=4.48; N=3.66; Cl=18.55.
Found: C=56.84; H=4.55 N=3.81; Cl=18.69, 18.80.

EXAMPLE VII

*D-threo-1-(p-benzoylphenyl)-2-acetamido-1,3-propanediol*

0.25 g. of D-threo-1-[p-(α-iminobenzylphenyl)]-2-acetamido-1,3-propanediol in 25 ml. of water is heated at 95° C. to 98° C. for two hours while a fine stream of nitrogen is bubbled under the surface to facilitate the removal of ammonia formed. Upon cooling to 25–29° C. a solution of 0.5 g. of ammonium sulfate in 5 ml. water is added and extracted three times with 25 ml. of ethyl acetate. The combined extracts are dried over sodium sulfate and the solvent is removed in vacuo. Recrystallization of this cake-like residue from 25 ml. of ethyl acetate-ether (2:1) gives 0.15 g. of D-threo-1-(p-benzoylphenyl)-2-acetamido-1,3-propanediol in the form of analytically pure white crystals, M.P. 139–140° C., $[\alpha]_D^{25} = +5.6$, c.=.95, 1=1, methanol.

Analysis for $C_{18}H_{19}NO_4$:
 Calc.: C=68.99; H=6.11; N=4.47.
 Found: C=69.16; H=5.98; N=4.53.

EXAMPLE VIII

*1-[D,L-p-(α-hydroxybenzyl)phenyl]-D-threo-2-(2,2-dichloroacetamido)-1,3-propanediol*

A mixture of 0.5 g. of D-threo-1-(p-benzoylphenyl)-2-(2,2-dichloroacetamide)-1,3-propanediol and 0.3 g. of potassium borohydride in 10 ml. of methanol is stirred magnetically for one-half hour and the resulting clear solution is allowed to stand for three hours at room temperature. The solvent is removed under nitrogen, the residue is taken up with 25 ml. of water and extracted three times with 25 ml. of ethyl acetate. The combined extracts are evaporated in vacuo at 30° C. The colorless semi-solid is passed over 10 g. of florisil, ethyl acetate being used as an eluant. Eight fractions, 20 ml. each are collected. The fractions 1–3, which contain most of the product, are combined and recrystallized from 30 ml. of ether-cyclohexane (2:1) to give 0.32 g of 1-[D,L-p-(α-hydroxybenzyl)phenyl] - D - threo-2-(2,2-dichloroacetamido-1,3-propanediol in the form of analytically pure white fine granules, M.P. 129–130° C., $[\alpha]_D^{25} = +5.5$, c.=1.125, methanol.

Analysis for $C_{18}H_{19}NCl_2O_4$:
 Calc.: C=56.26; H=4.98; Cl=18.46.
 Found: C=56.17; H=5.12; Cl=18.19, 18.33.

EXAMPLE IX

*D-threo-1-(p-isobutyrylphenyl)-2-acetamido-1,3-propanediol*

A solution of 1.0 g. of D-threo-1-(p-cyanophenyl)-2-acetamido-1,3-propanediol in 25 ml. dry tetrahydrofuran is added dropwise with stirring to 0.5 mole of isopropyl magnesium bromide reagent in tetrahydrofuran over a period of ten minutes, and the resulting clear solution is heated at 50° C. for three hours. A solution of 5.0 g. ammonium chloride in 10 ml. water is added at 0° C. and the two phases are separated. The aqueous phase is extracted twice with 20 ml. of ethyl acetate. The combined organic extracts are dried over sodium sulfate and the solvent is removed in vacuo at 50° C. The solid residue is redissolved in hot ethyl acetate, filtered and concentrated to 15 ml. to give on cooling 0.50 g. of D-threo-1-(p-isobutyrylphenyl)-2-acetamido-1,3-propanediol in the form of off-white crystals, M.P. 137–138° C. Further concentration of the mother liquor gives additional 0.4 g. of off-white crystals, M.P. 135–137° C. Recrystallization of the first crop from ethyl acetate gives analytically pure white crystals, M.P. 138–139° C., $[\alpha]_D^{25} = +2.0$, c.=1.15, methanol.

Analysis for $C_{15}H_{21}NO_4$:
 Calc.: C=64.49; H=7.58; N=5.01.
 Found: C=64.20; H=7.58; N=5.01.

EXAMPLE X

*D-threo-1-(p-isobutyrylphenyl)-2-amino-1,3-propanediol*

A solution of 8.0 g. of D-threo-1-(p-cyanophenyl)-2-acetamido-1,3-propanediol in 100 ml. of anhydrous tetrahydrofuran is added with stirring to 0.4 mole of isopropyl magnesium bromide reagent in tetrahydrofuran over a period of 15 minutes and the resulting clear solution is heated at 50° C. for three hours. A solution of 40 g. ammonium chloride in 80 ml. water is added dropwise at 0° C. and then stirred at 25° C. for two hours. The two phases are separated. The aqueous phase is extracted four times with 150 ml. of ethyl acetate, the combined extracts are dried over sodium sulfate and the solvent is removed in vacuo at 45° C. to give 9.5 g. of an orange-yellow semi-solid. Three-fourths (7.1 g.) of this residue is taken up with 100 ml. of 10% sulfuric acid and heated under nitrogen on a steam bath for three hours. After cooling to 20–25° C. the brown solution is extracted with 75 ml. of ether, and the extract, showing absence of both carbonyl and amide functions, is discarded. The aqueous part is made basic with concentrated sodium hydroxide at 0° C. and extracted five times with 10 ml. ethyl acetate. The combined extracts are dried over sodium sulfate and the solvent is removed in vacuo leaving behind 5.4 g. of D-threo - 1 - (p-isobutyrylphenyl)-2-amino-1,3-propanediol in the form of tan colored solid, M.P. 98–99° C. Recrystallization twice from ethyl acetate gives analytically pure off-white crystals, M.P. 108–109° C., $$[\alpha]_D^{25} = -22.0$$

c.=1.05, methanol.

Analysis for $C_{13}H_{19}NO_3$:
 Calc.: C=65.80; H=8.07; N=5.90.
 Found: C=66.01; H=7.96; N=5.66.

EXAMPLE XI

*D-threo-1-(p-isobutyrylphenyl)-2-(2,2-dichloroacetamido)-1,3-propanediol*

A solution of 4.4 g. of crude D-threo-1-(p-isobutyrylphenyl)-2-amino-1,3-propanediol ($[\alpha]_D^{25} = -20$, methanol, M.P. 98–99° C.) and 7.0 g. of methyl dichloroacetate in 50 ml. methanol is refluxed under nitrogen for four hours. The solvent and the excess methyl dichloroacetate are removed in vacuo. The residue is chromatographed over 100 g. florisil, ethyl acetate (fractions 1–10, 30 ml. each) and ethyl acetate-methanol (3:1), (fractions 11–16) being used as eluants. Fractions 2–10 on trituration with ether give 2.3 g. of D-threo-1-(p-isobutyrylphenyl)-2-(2,2-dichloroacetamido)-1,3-propanediol in the form of white crystals, M.P. 98–99° C., $[\alpha]_D^{25} = +13.5$, c.=1.10, methanol. A sample recrystallized from ether gives analytically pure white crystals, M.P. 100–101° C., $$[\alpha]_D^{25} = +15$$

c.=0.98, methanol.

EXAMPLE XII

*D-threo-1-(p-cyclohexylcarbonylphenyl)-2-acetamido-1,3-propanediol*

A solution of 0.5 g. of D-threo-1-(p-cyanophenyl)-2-acetamido-1,3-propanediol in 30 ml. dry tetrahydrofuran is added to 0.03 mole of cyclohexyl magnesium bromide in 40 ml. tetrahydrofuran with stirring and maintained at 35° C. for one hour. Since there is only little conversion, an additional 0.03 mole of the Grignard reagent is added and is heated for three hours at 35° C. and two hours at 45° C. until the infrared spectrum shows absence of the cyano function. A solution of 5 g. of ammonium chloride in 10 ml. water at 0° C. is added dropwise to the reaction mixture and the two phases are separated. The aqueous phase is extracted twice with 50 ml. ethyl acetate. The combined organic extracts are dried over sodium sulfate and the solvent is removed in vacuo. The residue is passed over 10 g. florisil, ethyl acetate being used as an eluant. Seven fractions (25 ml. each) are collected. The solvent is evaporated and the combined residue triturated with ethyl acetate to give D-threo-1-(p-cyclohexylcarbonylphenyl)-2-acetamido - 1,3 - propanediol in the form of off-white crystals, M.P. 181–183° C. Recrystallization from ethyl acetate gives white crystals, M.P. 184–185° C., $[\alpha]_D^{25} = +3.0$, c.=1.0, methanol.

Analysis for $C_{18}H_{25}NO_4$:
  Calc.: C=67.68; H=7.89; N=4.38.
  Found: C=67.88; H=8.01; N=4.60.

EXAMPLE XIII

*D-threo-1-(p-cyclohexylcarbonylphenyl)-2-(2,2-dichloroacetamido)-1,3-propanediol*

A solution of 8.0 g. of D-threo-1-(p-cyanophenyl)-2-acetamido-1,3-propanediol in 50 ml. anhydrous tetrahydrofuran is added dropwise with stirring to 0.4 mole of cyclohexyl magnesium bromide reagent in tetrahydrofuran over a period of ten minutes and then heated for four hours at 45° C. A solution of 40 g. ammonium chloride in 100 ml. water at 0° C. is added dropwise and then stirred at 25° C. for one hour. The aqueous phase is extracted three times with 100 ml. of ethyl acetate. The extracts are combined and the solvent is removed in vacuo at 40° C. The residue is taken up with 100 ml. of 10% aqueous sulfuric acid and heated on a steam bath under nitrogen for four hours. After cooling to 20–25° C. the brown-black solution is extracted twice with 100 ml. of ether and the extract is discarded. The aqueous part is made basic with concentrated sodium hydroxide at 0° C. and extracted four times with 150 ml. of ethyl acetate. The combined extracts are dried over sodium sulfate and the solvent is removed in vacuo. The residue is taken up with 100 ml. methanol and 15 ml. of methyl dichloroacetate and is refluxed under nitrogen for four hours. The solvent is removed in vacuo. The resulting dichloroacetamido derivative is passed over 100 g. florisil, ethyl acetate (fractions 1–13, 25 ml. each) and ethyl acetate methanol (3:1) (fractions 14–20) being used as eluants. Fractions 2–15 on trituration with ethyl acetate gives D-threo-1-(p-cyclohexylcarbonyl phenyl)-2-(2,2-dichloroacetamido)-1,3-propanediol in the form of white crystals, M.P. 161–163° C. $[\alpha]_D = +8.8$, c.=0.75, methanol. Recrystallization of 0.5 g. of this material from ethyl acetate gives white crystals, M.P. 163–164° C. $[\alpha]_D^{25} = +10.5$, c.=1.03, methanol.

Analysis for $C_{18}H_{23}NO_4Cl$:
  Calc.: C=55.68; H=5.97; N=3.61; Cl=18.26.
  Found: C=55.71; H=5.86; N=3.66; Cl=18.39, 18.41.

It is understood that the foregoing detailed description is given merely by way of illustration and that many variations may be made therein without departing from the spirit of our invention.

Having described our invention, what we desire to secure by Letters Patent is:

1. A compound selected from the group consisting of:

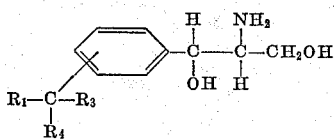

and

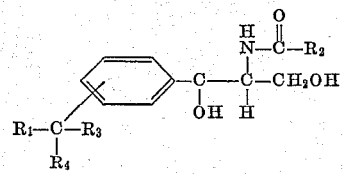

wherein $R_1$ is a member selected from the group consisting of lower alkyl, cyclopentyl, cyclohexyl, and phenyl, $R_2$ is a member selected from the group consisting of lower alkyl, and halo lower alkyl, $R_3$ is hydrogen when $R_4$ is hydroxy and $R_3$ and $R_4$ taken together form a member selected from the group consisting of =O, =NH and

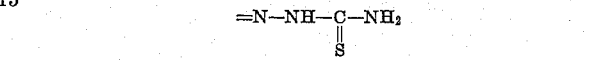

2. D-threo-1-(p-acetylphenyl) - 2 - acetamido - 1,3-propanediol.
3. D,L-threo - 1- (p - acetylphenyl)2-acetamido-1,3-propanediol.
4. D-threo - 1 - (p - acetylphenyl)-2-(2,2-dichloroacetamido)-1,3-propanediol.
5. D-threo - 4' - [2-(2,2-dichloroacetamido)-1,3-dihydroxypropyl]-acetophenone thiosemicarbazone.
6. D-threo - 1 - [p - (α-iminobenzylphenyl)]2-acetamido-1,3-propanediol.
7. D-threo - 1 - (p - benzoylphenyl)-2-(2,2-dichloroacetamido)-1,3-propanediol.
8. D-threo - 1 - (p-benzoylphenyl)-2-acetamido-1,3-propanediol.
9. 1-[D,L - p - (α - hydroxybenzyl)phenyl]-D-threo-2-(2,2-dichloroacetamido)-1,3-propanediol.
10. D-threo-1-(p-isobutyrylphenyl) - 2 - acetamido-1,3-propanediol.
11. D-threo - 1 - (p-isobutyrylphenyl)-2-amino-1,3-propanediol.
12. D-threo - 1 - (p - isobutyrylphenyl)-2-(2,2-dichloroacetamido)-1,3-propanediol.
13. D-threo - 1 - (p-cyclohexylcarbonylphenyl) - 2-acetamido-1,3-propanediol.
14. D-threo - 1 - (p - cyclohexylcarbonylphenyl)-2-(2,2-dichloroacetamido)-1,3-propanediol.
15. D,L-threo - 1 - (p - acetylphenyl)-2,2-dichloroacetamide)-1,3-propanediol.

References Cited by the Examiner
UNITED STATES PATENTS

| | | | |
|---|---|---|---|
| 2,568,571 | 9/51 | Sullivan | 260—562 |
| 2,597,248 | 5/52 | Kerwin et al. | 260—570 |
| 2,600,077 | 6/52 | Schmidt et al. | 260—552 |
| 2,721,207 | 10/55 | Bambas | 260—570 |
| 2,921,080 | 1/60 | Archer et al. | 260—465 |

IRVING MARCUS, *Primary Examiner.*

NICHOLAS S. RIZZO, *Examiner.*